United States Patent
Ji et al.

(10) Patent No.: US 11,385,904 B2
(45) Date of Patent: Jul. 12, 2022

(54) METHODS AND APPARATUS FOR SELECTING OPERATING MODES IN A DEVICE

(71) Applicant: Active-Semi, Inc., Tortola (VG)

(72) Inventors: Shu Ji, Allen, TX (US); Chin-Ming Cheng, Taoyuan (TW)

(73) Assignee: ACTIVE-SEMI, INC., Tortola (VG)

( * ) Notice: Subject to any disclaimer, the term of this patent is extended or adjusted under 35 U.S.C. 154(b) by 91 days.

(21) Appl. No.: 16/528,614

(22) Filed: Jul. 31, 2019

(65) Prior Publication Data

US 2020/0301716 A1 Sep. 24, 2020

Related U.S. Application Data

(60) Provisional application No. 62/820,802, filed on Mar. 19, 2019.

(51) Int. Cl.

| | |
|---|---|
| *G06F 9/44* | (2018.01) |
| *G06F 1/26* | (2006.01) |
| *G06F 9/4401* | (2018.01) |
| *G06F 11/07* | (2006.01) |

(52) U.S. Cl.
CPC ............... *G06F 9/441* (2013.01); *G06F 1/26* (2013.01); *G06F 11/0727* (2013.01); *G06F 11/0751* (2013.01); *G06F 11/0793* (2013.01)

(58) Field of Classification Search
None
See application file for complete search history.

(56) References Cited

U.S. PATENT DOCUMENTS

| 5,818,299 | A | * | 10/1998 | Tran | ...................... | H03G 3/348 |
|---|---|---|---|---|---|---|
| | | | | | | 330/149 |
| 2004/0177242 | A1 | * | 9/2004 | Erickson | ................. | H04L 12/12 |
| | | | | | | 713/2 |
| 2009/0240932 | A1 | * | 9/2009 | Hattori | ...................... | G06F 8/65 |
| | | | | | | 713/1 |
| 2011/0022826 | A1 | * | 1/2011 | More | ........................ | G06F 1/26 |
| | | | | | | 713/1 |
| 2011/0161646 | A1 | * | 6/2011 | Yu | ........................ | G06F 9/4401 |
| | | | | | | 713/2 |
| 2013/0103935 | A1 | * | 4/2013 | Maddigan | ................. | G06F 1/24 |
| | | | | | | 713/2 |

(Continued)

*Primary Examiner* — Danny Chan

(74) *Attorney, Agent, or Firm* — Withrow & Terranova, P.L.L.C.

(57) ABSTRACT

Methods and apparatus for selecting operating modes in a device are disclosed. In an embodiment, a method includes powering on a device that is configured to operate in safe and normal operating modes, detecting whether the device enters the normal operating mode within a time interval, and enabling the device to operate in the safe operating mode when the device does not enter the normal operating mode within the time interval. In an embodiment, an apparatus includes a power signal controller that powers on a device that is configured to operate in safe and normal operating modes, a state machine that detects whether the device enters the normal operating mode within a time interval, and a control signal controller that enables the device to operate in the safe operating mode when the device does not enter the normal operating mode within the time interval.

10 Claims, 6 Drawing Sheets

(56) References Cited

U.S. PATENT DOCUMENTS

| | | | |
|---|---|---|---|
| 2014/0068354 A1* | 3/2014 | Park | G06F 11/0742 |
| | | | 714/55 |
| 2014/0281450 A1* | 9/2014 | Friedman | G06F 11/07 |
| | | | 713/2 |
| 2015/0331754 A1* | 11/2015 | Grobelny | G06F 9/441 |
| | | | 714/23 |
| 2015/0339179 A1* | 11/2015 | Olsen | G06F 11/1497 |
| | | | 714/51 |
| 2015/0363211 A1* | 12/2015 | Milman | G06F 21/31 |
| | | | 713/2 |
| 2016/0232057 A1* | 8/2016 | Star | G06F 9/4408 |
| 2018/0365449 A1* | 12/2018 | Meriac | G06F 21/74 |
| 2019/0018964 A1* | 1/2019 | Basehore | G06F 8/65 |
| 2020/0012552 A1* | 1/2020 | Brown | G06F 9/4403 |
| 2020/0106257 A1* | 4/2020 | Gupta | H02H 1/0007 |

\* cited by examiner

CONTROL DEVICE IN NORMAL OPERATING MODE
(NO PROBLEM DETECTED)

CONTROL DEVICE IN SAFE MODE

METHODS AND APPARATUS FOR SELECTING OPERATING MODES IN A DEVICE

CROSS-REFERENCE TO RELATED APPLICATIONS

This application claims the benefit under 35 U.S.C. § 119 of U.S. Provisional Application No. 62/820,802, filed on Mar. 19, 2019, and entitled "Methods And Apparatus For Selecting Operating Modes in a Device," which is incorporated herein by reference in its entirety.

TECHNICAL FIELD

The present invention relates generally to selecting operating modes in a device, and in particular, to activating a safe mode in a device.

BACKGROUND INFORMATION

Applying power to an electronic device generally causes the device to begin normal operations. During normal operations, inputs are received, data is processed, and outputs are generated. However, if the device malfunctions, it may not be able to enter into its normal operating mode. For example, a device malfunction may mean that a component in the device has failed, a memory error has occurred, or that the device is locked up in an inoperable state. Unfortunately, fixing the device may mean returning the device to the manufacturer for service. This results in the loss of use of the device and additional costs and shipping charges. The data safety will be an even bigger concern.

However, at the manufacturer, the device may be repaired by simply rebooting the device in a mode that resets the device and correct error conditions. For example, this mode can be referred to as a "safe mode." The safe mode is typically accessed by providing special control signaling when powering up the device. Once in the safe mode, the device performs fault processing to reboot systems and correct certain types of errors. Device users typically don't have access to equipment that can provide the signaling necessary to place the device in safe mode. Thus, even though the device has a safe mode in which it can repair itself, users must still return the device to the manufacturer for this mode to be accessed.

Therefore, it is desirable to have a mechanism for automatically enabling a safe mode in a device to perform fault processing.

SUMMARY

In various embodiments, power management is provided for accessing a safe mode in a device to perform fault processing. In an embodiment, when a device fails to power-up in a normal operating mode, power and control signaling are provided to initiate safe mode operation. During safe mode operation, the device reboots internal systems and corrects certain types of errors. Once safe mode operation is complete, additional power and control signaling is provided to return the device to the normal operating mode.

In an embodiment, power management is provided by a power management integrated circuit (PMIC) that can be included in any type of device that has safe mode operation. In another embodiment, the functions and operations of the PMIC are integrated directly in existing device hardware and/or firmware so that a separate integrated circuit is not needed. The power management functions are not limited to any particular device, but are suitable for use with any device that provides safe mode operation.

During operation of a device, such as a solid state memory device, it is possible that an error occurs during startup that prevents the device from starting properly. The device is capable of resolving such errors, but needs to be placed in the safe operating mode to do so. In various embodiments, the PMIC attempts to power up the device into a normal operating mode. If an error occurs, the PMIC automatically initiates signaling to place the device in safe mode. After safe mode operation, the PMIC signals the device to restart in the normal mode. Thus, at every power up, if an error occurs that prevents the device from starting normally, the device is automatically placed in the safe mode without requiring any user input. In the safe mode the device reboots its internal systems to clear any errors. At the end of the safe mode, the device is automatically returned to the normal mode. Because the system operates automatically without user input, the user may not even know an error has occurred.

In an exemplary embodiment, a method is provided that includes powering on a device that is configured to operate in a safe operating mode and in a normal operating mode, detecting whether the device enters the normal operating mode within a first time interval, and enabling the device to operate in the safe operating mode when the device does not enter the normal operating mode within the first time interval.

In an exemplary embodiment, an apparatus is provided that includes a power signal controller that powers on a device that is configured to operate in a safe operating mode and in a normal operating mode, a state machine that detects whether the device enters the normal operating mode within a first time interval, and a control signal controller that enables the device to operate in the safe operating mode when the device does not enter the normal operating mode within the first time interval.

Further details and embodiments are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
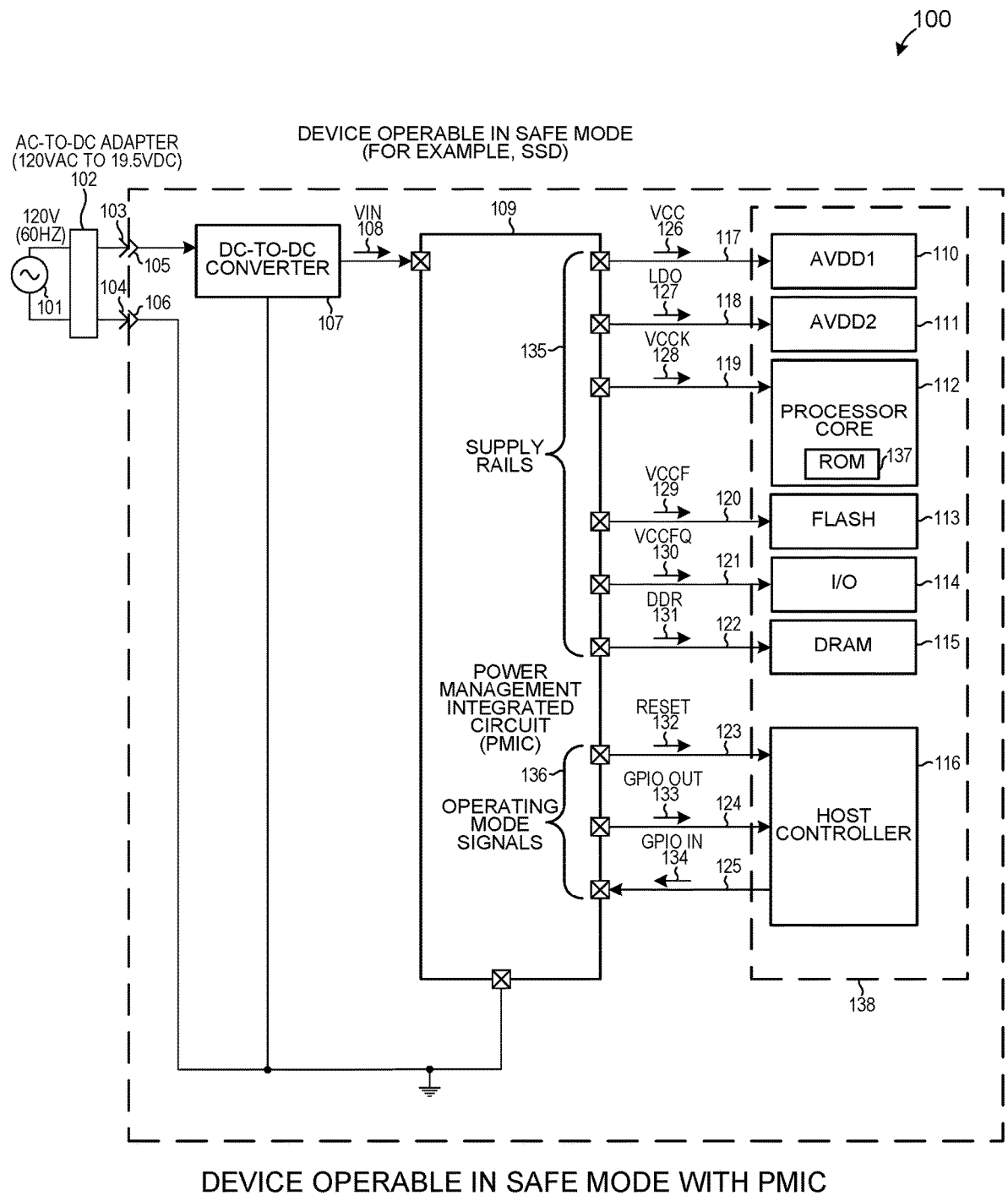
FIG. 1 shows a device that includes an exemplary embodiment of a power management integrated circuit.

FIG. 1 shows a device 100 that includes an exemplary embodiment of a power management integrated circuit (PMIC) 109. The device 100 comprises DC-to-DC converter 107, the PMIC 109, and a solid state memory device (SSD) 138. It should be noted that embodiments of a power management integrated circuit (PMIC) 109 are not limited for use with only SSD devices, but are suitable for use with any device having a safe mode of operation.

To operate the device 100, an AC signal from an AC power source 101 is converted to DC by AC-to-DC adapter 102. DC power and ground are provided at connections 103 and 104, respectively. Mating connector 105 routes DC power to the converter 107. Mating connector 106 routes a ground signal to components of the device 100.

The converter 107 converts the received DC power to generate VIN 108, which is also DC, and which is applied to the PMIC 109 as well as to other components of the device 100.

The PMIC 109 outputs supply rails 135 to the SSD 138. For example, the PMIC 109 outputs VCC 126 on power line 117 to AVDD1 110, LDO 127 on power line 118 to AVDD2 111, VCCK 128 on power line 119 to processor core 112, VCCF 129 on power line 120 to flash memory 113, VCCFQ 130 on power line 121 to I/O circuitry 114, and DDR 131 on power line 122 to DRAM 115.

The PMIC 109 communicates operating mode signals 136 with the SSD 138. For example, the PMIC 109 outputs RESET 132 on signal line 123 and GPIO OUT 133 on signal line 134 to host controller 116. The PMIC 109 receives GPIO IN 134 on signal line 125 from the host controller 116.

During operation, the PMIC 109 interfaces with the SSD 138 to set the operating mode. For example, under normal conditions, the SSD 138 starts up in a normal operating mode. In this mode, the processor core 112 accesses internal ROM 137 to obtain stored configuration parameters. The processor core 112 then accesses the flash memory 113 to obtain firmware instructions that control general operation of the SSD 138. However, if the flash memory 113 or other component of the SSD 138 has an error or otherwise fails, then the SSD 138 may be inoperable. In this event, the SSD 138 can operate in a "safe mode" in which its systems can be rebooted and errors corrected. After the SSD 138 performs safe mode processing, the SSD 138 becomes operable in the normal operating mode.

In various embodiments, the PMIC 109 operates to manage the operating modes of the SSD 138. For example, at power-up, the PMIC 109 controls the SSD 138 to begin operation in the normal operating mode. The PMIC 109 does this by controlling the timing and sequence of the supply rails 135 and operating mode signals 136. If the SSD 138 successfully powers up in the normal operating mode, the PMIC 109 performs no further actions.

However, should the SSD 138 fail to power-up in the normal operating mode, the PMIC 109 controls the SSD 138 to begin operation in the safe operating mode. The PMIC 109 does this by controlling the timing and sequence of the supply rails 135 and operating mode signals 136. The safe operating mode allows the SSD 138 to reboot and clear error conditions. After SSD 138 successfully powers up in the safe operating mode, the PMIC 109 sends signals to the SSD 138 to switch back to the normal operating mode. Thus, the PMIC 109 monitors the startup of the SSD 138 and controls the SSD 138 to initiate corrective action in safe mode if the SSD 138 fails to successfully power up in the normal operating mode.

Figure 2:
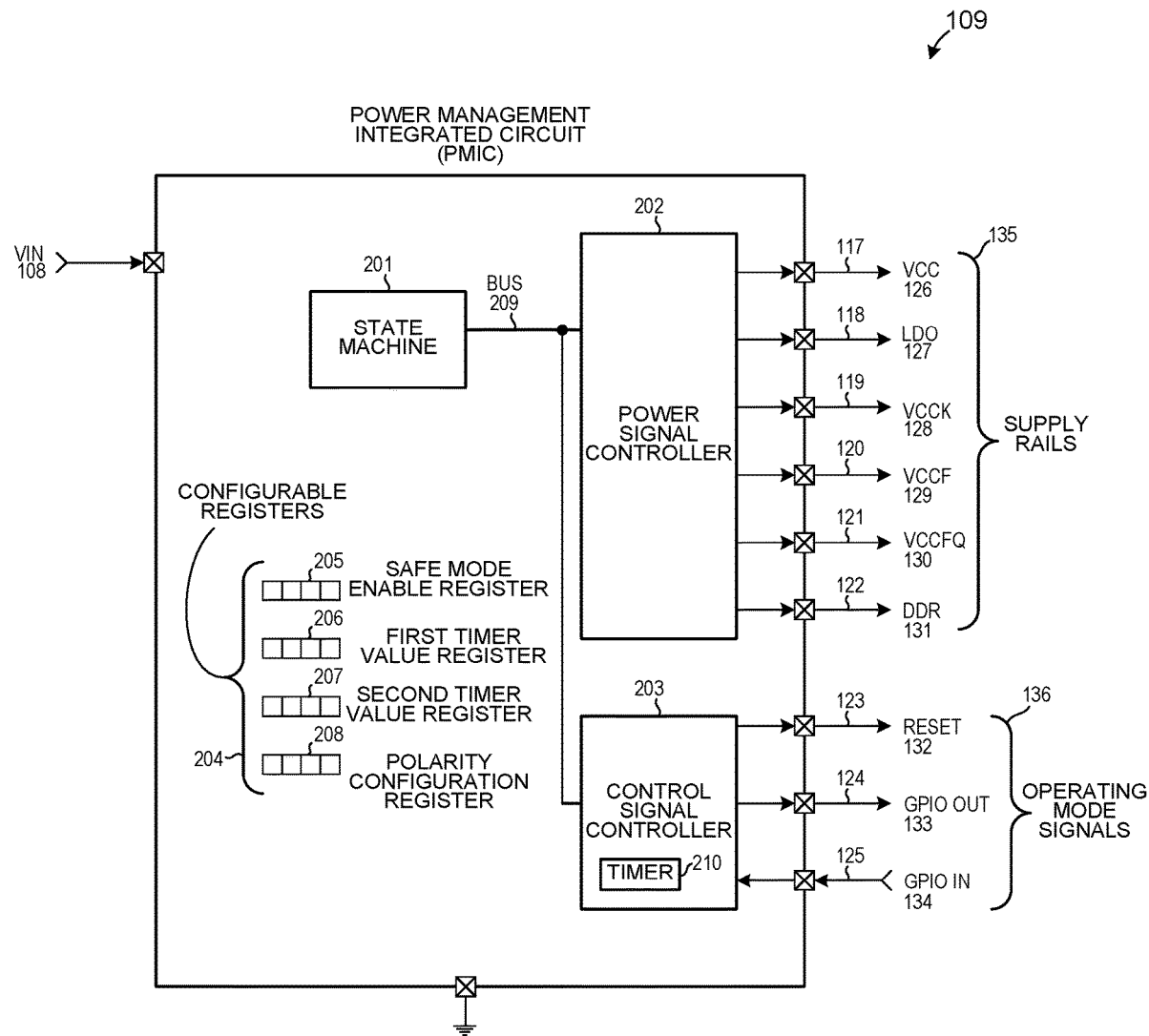
FIG. 2 shows a detailed exemplary embodiment of the power management integrated circuit shown in FIG. 1.

FIG. 2 shows a detailed exemplary embodiment of the power management integrated circuit 109 shown in FIG. 1. In an exemplary embodiment, the PMIC 109 comprises state machine 201, power signal controller 202, control signal controller 203, and registers 204 that are all configured to communicate with each other using bus 209. In an embodiment, the registers 204 comprise safe mode enable register 205, first timer value register 206, second time value register 207, and polarity configuration register 208.

The state machine 201 comprises at least one of a CPU, processor, programmable logic, memory, registers, discrete components, firmware, or other components configured to perform the operations described herein. The state machine 201 communicates with the power signal controller 202 and the control signal controller 203 using the bus 209. The state machine 210 provides overall control of the PMIC 109.

The power signal controller 202 comprises at least one of a CPU, processor, programmable logic, memory, registers, discrete components, firmware, or other components configured to perform the operations described herein. The power signal controller 202 outputs the supply rails 135 to the SSD 138. The power signal controller 202 controls the timing, level, and sequence used to enable or disable the supply rails 135.

The control signal controller 203 comprises at least one of a CPU, processor, programmable logic, memory, registers, discrete components, firmware, or other components configured to perform the operations described herein. In an embodiment, the control signal controller 203 includes a timer 210 that is used to time one or more time intervals. These time intervals are used to time the duration of the operating mode signals 136. In an embodiment, the registers 204 are part of the control signal controller 203. The safe mode register 205 stores a value that is used to enable one of the normal operating mode and the safe mode. The first timer value register 206 stores a value that is used to measure a first time interval. The second timer value register 207 stores a value that is used to measure a second time interval. The polarity configuration register 208 stores values that are used to determine the polarity of the operating mode signals 136. It should be noted that the components of the PMIC 109 can be separate components or integrated into a single unit. A more detailed discussion of the PMIC 109 is provided below.

Figure 3:
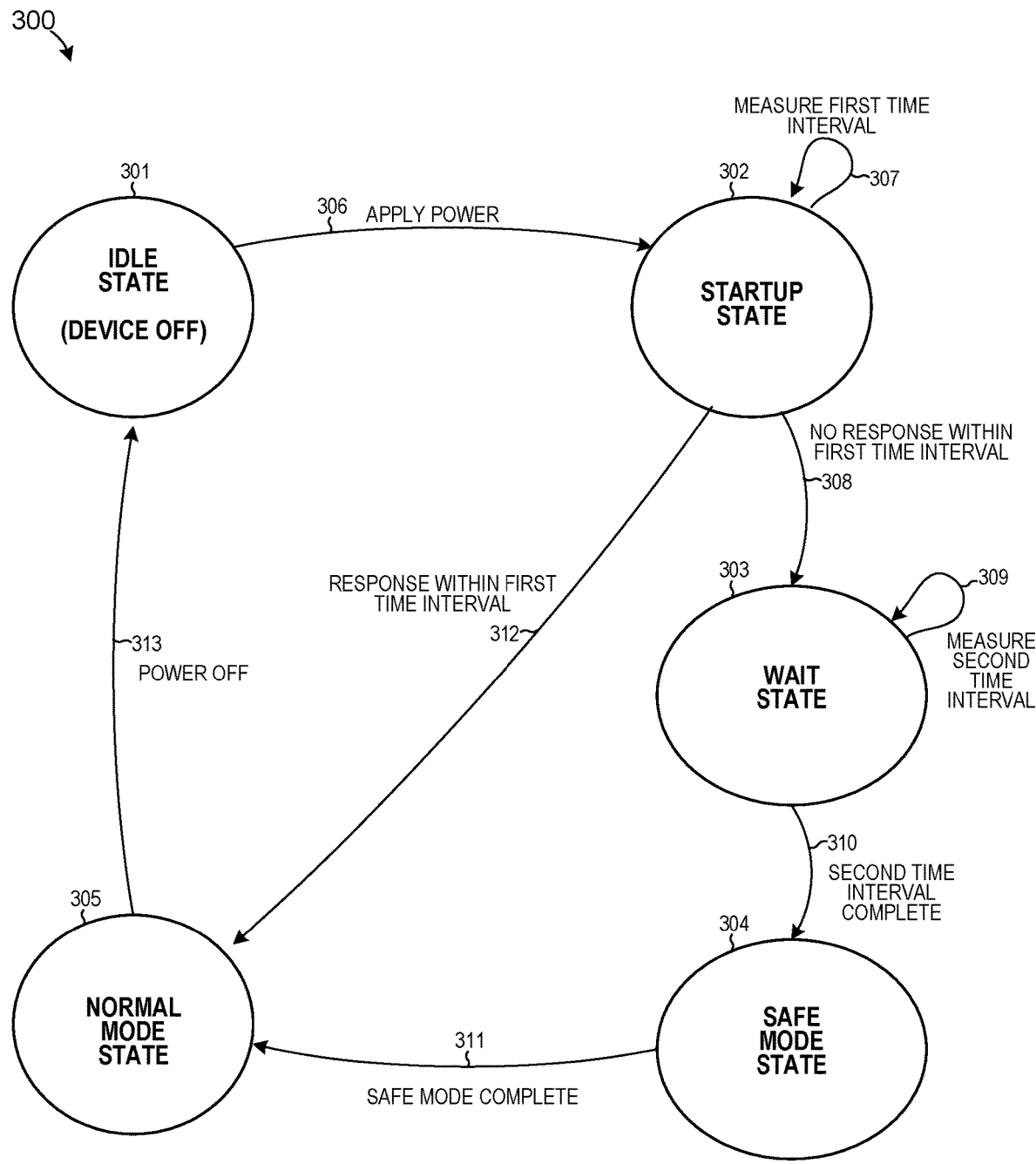
FIG. 3 shows an exemplary embodiment a state diagram that illustrates operating states of the power management integrated circuit shown in FIGS. 1-2.

FIG. 3 shows an exemplary embodiment a state diagram 300 that illustrates operating states of the power management integrated circuit 109 shown in FIGS. 1-2. For example, the state diagram 300 illustrates operating states for use with the state machine 201 shown in FIG. 2. The state diagram 300 comprises an idle state 301, startup state 302, wait state 303, safe mode state 304, and normal mode state 305.

The device 100 starts in the idle state 301 with power off. There is no activity in the idle state. Transition 306 from the idle state 301 to the startup state 302 occurs if power is applied to the device. For example, when VIN 108 is received by the PMIC 109 the transition 305 occurs.

In the startup state 302, a first time interval 307 is measured. In an embodiment, the first time interval is 7 seconds but can be programmed to other durations. In the startup state 302, power and control signaling is performed to enter the normal mode state 305. Transition 312 from the startup state 302 to the normal mode state 305 occurs if there is a response indicating successful startup during the first time interval 307. Transition 308 from the startup state 302 to the wait state 303 occurs if there is no response indicating successful startup during the first time interval 307.

In the wait state 303, a second time interval 309 is measured. In an embodiment, the second time interval is 100 milliseconds but can be programmed to other durations. Supply rails providing power to selected device functions are powered down. Transition 310 from the wait state 303 to the safe mode state 304 occurs at the completion of the second time interval 309.

In the safe mode state 304, the supply rails are sequentially powered up and control signaling is provided to enter the safe mode. The device performs safe mode operations, such as rebooting selected systems and clearing error conditions. These are repair operations to repair the conditions that prevented the device from transitioning from the startup state 302 to the normal mode state 305. Transition 311 from the safe mode state 304 to the normal mode state 305 occurs after the completion of the operations in the safe mode state.

In the normal mode state 305, the device performs normal operations without error. Transition 313 from the normal mode state 305 to the idle state 301 occurs if the power is turned off or otherwise removed. Thus, the state diagram 300 illustrates operating states of the power management integrated circuit to control a device to automatically enter the safe mode state 304 if the device fails to enter the normal mode state 305 from the startup state 302.

Figure 4:
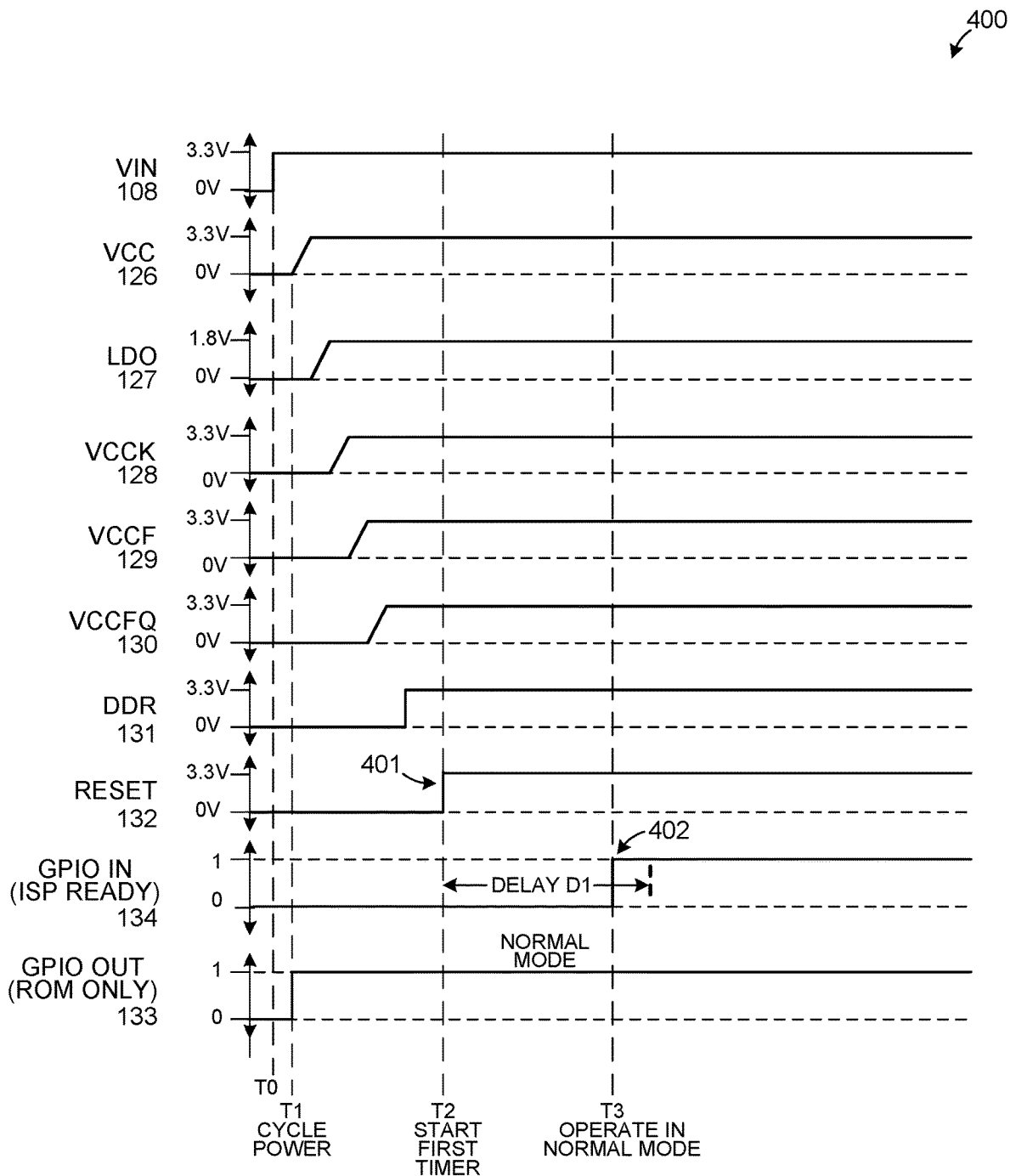
FIG. 4 shows a timing diagram that illustrates how the power management integrated circuit controls a device to operate in a normal mode.

FIG. 4 shows a timing diagram 400 that illustrates how the power management integrated circuit 109 controls a device to operate in a normal mode. For example, the timing diagram 400 is suitable for use with the power management integrated circuit 109 shown in FIGS. 1-2.

At time T0, power is received by the PMIC 109. For example, VIN 108 is received at a 3.3 volt level by the PMIC 109 as shown in FIG. 2. The receipt of power activates the state machine 201 and other functional blocks of the PMIC.

At time T1, GPIO OUT 133 is output at a high level (logic 1) by the control signal controller 203. Setting GPIO OUT 133 to a high level indicates that the device should attempt to power up in a normal operating mode.

With the normal operating mode indicator set, power to the device is cycled on. For example, the supply rails VCC 126, LDO 127, VCCK 128, VCCF 129, VCCFQ 130, and DDR 131 are sequentially turned on to their corresponding operating power levels.

At time T2, a reset is signaled to the device and a first timer is started to measure a first time interval. For example, RESET 132 is raised to a high level (indicated at 401) and the first time interval is started. In an embodiment, the control signal controller 203 outputs RESET 132 at a high logic level and starts an internal timer to measure the first time interval (indicated by DELAY D1). In an embodiment, the first time interval is set to 7 seconds, however, this interval is programmable. For example, a first timer value is stored in the register 206 and this value is used by the internal timer 210 of the control signal controller 203 to measure the first time interval.

At time T3, the device responds by raising GPIO IN 134 to a high level within the first time interval to indicate that startup was successful and that the device will operate in normal operating mode. For example, the host controller 116 outputs GPIO IN 134 at a high level (indicated at 402) prior to the end or expiration of the first time interval (DELAY D1) to indicate that the device startup was successful and that the device will operate in a normal mode.

Thus, the timing diagram 400 illustrates how the power management integrated circuit controls a device to power up and operate in normal mode. If the host controller 116 does not output GPIO IN 134 at a high level prior to the end or expiration of the first time interval (DELAY D1), then the device has indicated that startup was not successful. In this case, safe mode operation is selected as described in greater detail below.

Figure 5:
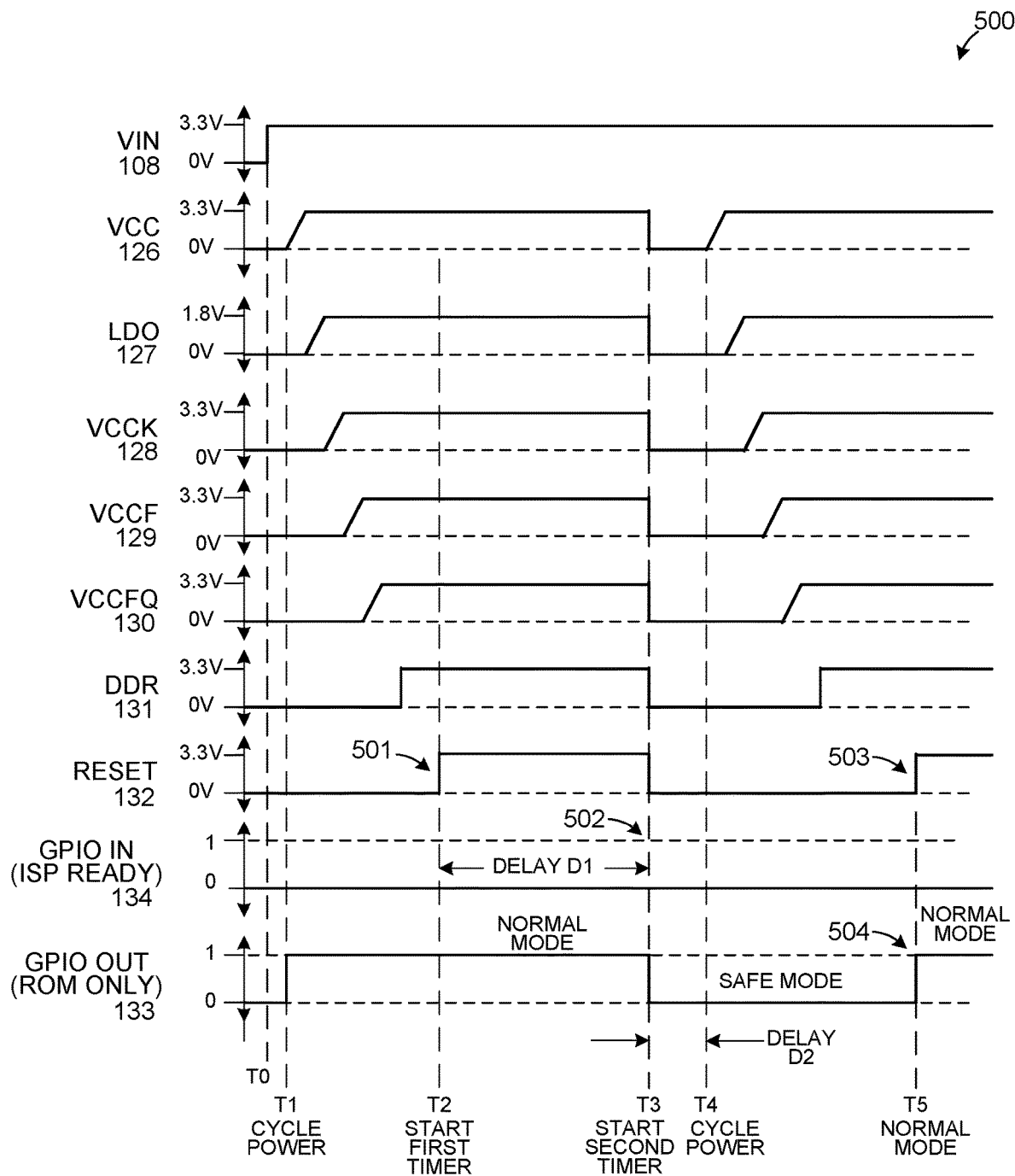
FIG. 5 shows a timing diagram that illustrates how the power management integrated circuit controls a device to operate in a safe mode.

FIG. 5 shows a timing diagram 500 that illustrates how the power management integrated circuit 109 controls a device to operate in safe mode. For example, the timing diagram 500 is suitable for use with the power management integrated circuit 109 shown in FIG. 2.

At time T0, power is received by the PMIC 109. For example, VIN 108 is received at a 3.3 volt level by the PMIC 109 as shown in FIG. 2. The receipt of power activates the state machine 201 and other functional blocks of the PMIC.

At time T1, GPIO OUT 133 is output at a high level (logic 1) by the control signal controller 203. Setting GPIO OUT 133 to a high level indicates that the device should attempt to power up in a normal operating mode.

With GPIO OUT 133 set high, power to the device is cycled on. For example, the supply rails VCC 126, LDO 127, VCCK 128, VCCF 129, VCCFQ 130, and DDR 131 are sequentially turned on to their corresponding operating power levels.

At time T2, a reset is signaled to the device and a first timer is started to measure a first time interval. For example, RESET 132 is raised to a high level (indicated at 501) and the first time interval is started. In an embodiment, the control signal controller 203 outputs RESET 132 at a high logic level and starts an internal timer to measure the first time interval (indicated by DELAY D1). In an embodiment, the first time interval is set to 7 seconds, however, this interval is programmable. For example, a first timer value is stored in the register 206 and this value is used by the internal timer 210 of the control signal controller 203 to measure the first time interval.

At time T3, the device fails to respond to RESET 132 within the first time interval (indicated at 502). By not responding to RESET 132 within the first time interval (e.g., by not raising GPIO IN high), the device has indicated that startup in normal mode was unsuccessful.

Since startup in normal mode was unsuccessful, a second timer is started to measure a second time interval (DELAY D2). In an embodiment, the second time interval is set to 100 millisecond (ms), however, this interval is programmable. For example, a second timer value is stored in the register 207 and this value is used by the internal timer 210 of the control signal controller 203 to measure the second time interval. The supply rails VCC 126, LDO 127, VCCK 128, VCCF 129, VCCFQ 130, and DDR 131 are turned off. In addition, RESET 132 and GPIO OUT 133 are set to a low voltage level (logic 0). Since startup in the normal mode has failed, startup in safe mode is now attempted.

At time T4, the end or expiration of the second time interval (Delay D2) occurs and the supply rails VCC 126, LDO 127, VCCK 128, VCCF 129, VCCFQ 130, and DDR 131 are sequentially turned on. RESET 132 and GPIO OUT 133 remain in a low state (logic 0). The device now operates in safe mode.

At time T5, operation in normal mode is attempted after safe mode completes. For example, in an embodiment, a timer is set to measure a fixed safe mode time interval, at the end of which, return to normal mode is attempted. In another embodiment, a wait for a programmable time duration occurs before attempting to return to the normal mode. In still another embodiment, signaling from the device, such as on the signal GPIO IN 134, occurs before the attempt to return to the normal mode.

When switching to the normal mode, RESET 132 is raised to a high level (indicated at 503) and GPIO OUT 133 is raised to a high level (indicated at 504). The device responds to the changing state of these signals by switching operation to the normal mode.

Thus, the timing diagram 500 illustrates how the power management integrated circuit controls a device to power up and operate in safe mode after which the normal operating mode is entered.

Figure 6:
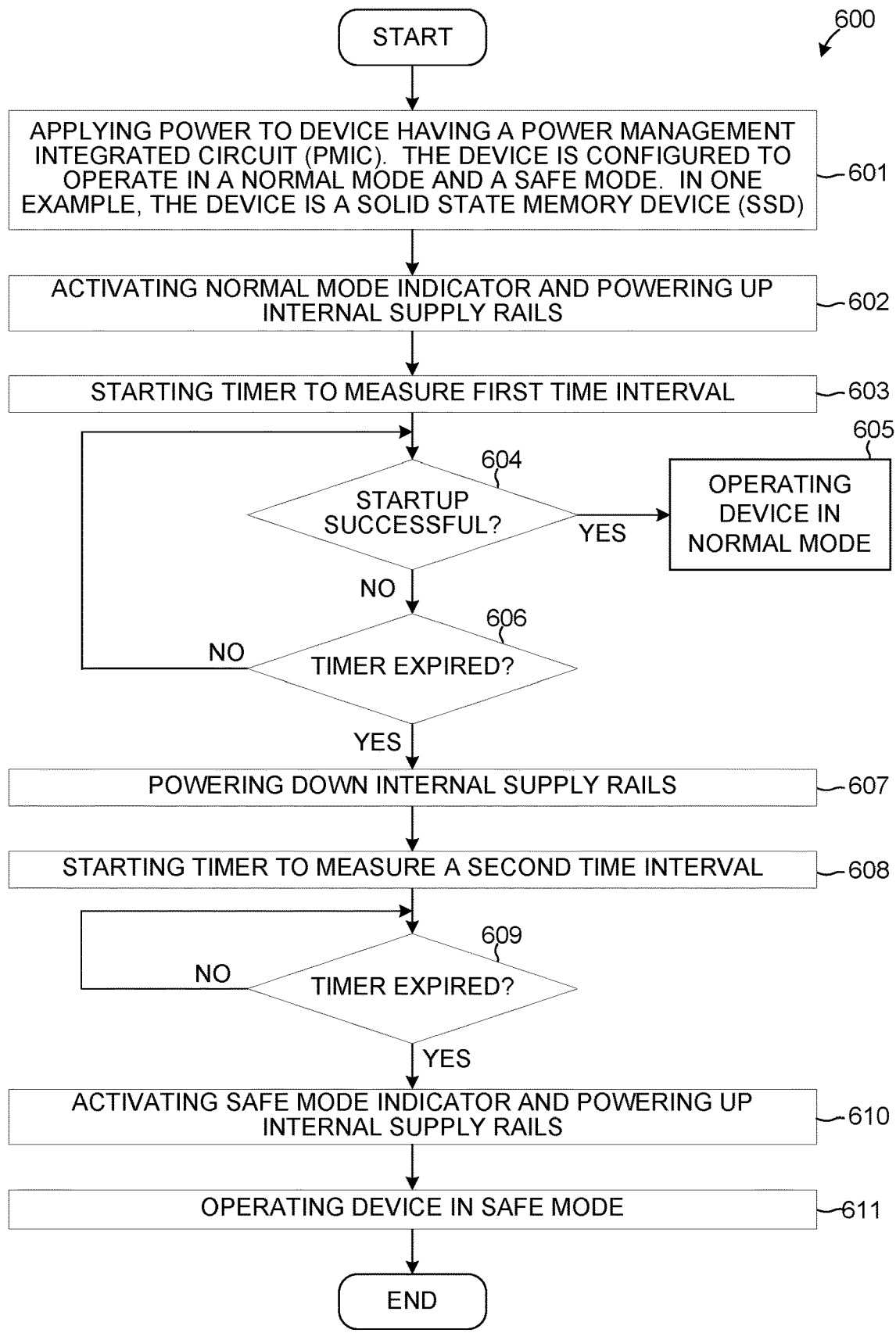
FIG. 6 shows an exemplary embodiment of a method for providing power management to a device that is configured to operate in a normal mode and a safe mode.

FIG. 6 shows an exemplary embodiment of a method 600 for providing power management to a device that is configured to operate in a normal mode and a safe mode. For example, the method 600 is suitable for use with the power management integrated circuit 109 to control the operation of the SSD 138 shown in FIG. 1. The method 600 is not limited to use with SSD devices, but can be used with any device having normal and safe operating modes.

At block 601, power is applied to a device having a power management integrated circuit. For example, the DC-to-DC converter 107 applies power to the PMIC 109 and the SSD 138.

At block 602, a normal mode indicator is activated and internal supply rails of the device are powered up. It will be assumed that the control signal controller 203 obtains a polarity configuration value from the polarity configuration register 208 and uses this value to set the polarity of signals used in the method 600. The control signal controller 203 outputs GPIO OUT 133 at a logic high state and the power signal controller 202 powers up the supply rails 135. For example, the supply rails 135 are powered up in sequence as illustrated during the time interval T1-T2 shown in FIG. 4.

At block 603, a timer is started to measure a first time interval. For example, the control signal controller 203 obtains a first time value from the first timer value register 206 and uses this value to enable to the timer 210 to time the first time interval.

At block 604, a determination is made as to whether startup of the device was successful. For example, startup is successful if a high logic level on GPIO IN 134 is received by the control signal controller 203 before the expiration of the first time interval, as illustrated at 402 in FIG. 4. If startup was successful, the method proceeds to block 605. If startup was not successful, the method proceeds to block 606.

At block 605, the device is operated in a normal mode.

At block 606, a determination is made as to whether the timer has expired. For example, the control signal controller 203 determines when the timer 210 completes measuring the first time interval. If the timer has not completed measuring the first time interval, the method proceeds to block 604. If the timer has completed measuring the first time interval, the method proceeds to block 607.

At block 607, the internal supply rails of the device are powered down. For example, the power signal controller 202 powers down the supply rails 135.

At block 608, a timer is started to measure a second time interval. For example, the control signal controller 203 obtains a second time value from the second timer value register 207 and uses this value to enable to the timer 210 to time the second time interval.

At block 609, a determination is made as to whether the timer has expired. For example, the control signal controller 203 determines when the timer 210 completes measuring the second time interval. If the timer has not completed measuring the second time interval, the method returns to block 609. If the timer has completed measuring the second time interval, the method proceeds to block 610.

At block 610, a safe mode indicator is activated and internal supply rails of the device are powered up. For example, the control signal controller 203 outputs GPIO OUT 133 at a logic low state and the power signal controller 202 powers up the supply rails 135. For example, the supply rails 135 are powered up in sequence as illustrated during the time interval T4-T5 shown in FIG. 5.

At block 611, the device is operated in a safe mode. For example, the device operates is safe mode as illustrated by the time interval defined by T3-T5 as shown in FIG. 5. At the completion of the safe mode, the normal operating mode of the device is enabled.

Thus, the method 600 operates to provide power management to a device that is configured to operate in a normal mode and a safe mode. It should be noted that the operations described in the method 600 are exemplary and that changes, additions, deletions, rearrangements or other modifications to the operations are within the scope of the embodiments.

As described above, the PMIC 109 operates to automatically initiate safe mode operation for a device when normal operation fails. The PMIC 109 provides control signaling to accomplish this. In another embodiment, safe mode is entered in response to receiving one or more safe-mode pulses. For example, during power-up of a device, one or more safe mode pulses are provided that cause the device to enter the safe mode. For example, the safe mode pulses can be provided on a separate signaling line or can be added to or multiplexed on an existing signal line. Thus, there are a variety of way to initiate safe mode operation and the embodiments described herein are not limited to any particular method or technique.

Although certain specific embodiments are described above for instructional purposes, the teachings of this patent document have general applicability and are not limited to the specific embodiments described above. The function of the hardware circuitry illustrated in the figures can be implemented in hardware circuitry as shown, or in a combination of dedicated hardware circuitry and software, or largely in software. Accordingly, various modifications, adaptations, and combinations of various features of the described embodiments can be practiced without departing from the scope of the invention as set forth in the claims.

What is claimed is:

1. A method comprising:
    powering on a solid state memory device (SSD), using a power management integrated circuit (PMIC), comprising:
        setting an operating mode signal to a first pre-determined logic level to cause the SSD to power on in a normal operating mode; and
        powering on supply rails of the SSD;
    detecting whether the SSD enters the normal operating mode within a first time interval;
    when the SSD does not enter the normal operating mode within the first time interval, powering down the supply rails of the SSD and waiting a second time interval before using the PMIC to set the operating mode to a second predetermined logic level to cause the SSD to operate in a safe operating mode; and
    after the second time interval, resetting power to the SSD by sequentially powering on the supply rails of the SSD to operate in the safe operating mode.

2. The method of claim 1, further comprising causing the SSD to operate in the normal operating mode when the SSD enters the normal operating mode within the first time interval.

3. The method of claim 1, wherein powering on the supply rails of the SSD comprises sequentially powering on the supply rails of the SSD.

4. The method of claim 1, further comprising using the PMIC to set the operating mode signal to the first predetermined logic level to cause the SSD to operate in the normal operating mode after the SSD operates in the safe operating mode.

5. The method of claim 1, further comprising determining a duration of the first time interval from a value stored in a register.

6. A power management integrated circuit (PMIC) coupled to a solid state memory device (SSD), the PMIC comprising:
   a power signal controller configured to supply power to the SSD;
   a control signal controller configured to provide an operating mode signal to control an operating mode of the SSD between a normal operating mode and a safe operating mode; and
   a state machine configured to:
      cause the control signal controller to set the operating mode signal such that the SSD powers on in the normal operating mode;
      detect whether the SSD enters the normal operating mode within a first time interval;
      when the SSD does not enter the normal operating mode within the first time interval, cause the power signal controller to power down supply rails of the SSD and the control signal controller to wait a second time interval before setting the operating mode such that the SSD operates in the safe operating mode; and
      after the second time interval, cause the power signal controller to reset power to the SSD by sequentially powering on the supply rails of the SSD to operate in the safe operating mode.

7. The PMIC of claim 6, wherein the PMIC causes the SSD to operate in the normal operating mode when the SSD enters the normal operating mode within the first time interval.

8. The PMIC of claim 6, wherein the power signal controller is further configured to sequentially power on supply rails of the SSD.

9. The PMIC of claim 6, wherein the state machine is further configured to cause the control signal controller to cause the SSD to operate in the normal operating mode after the SSD operates in the safe operating mode.

10. The PMIC of claim 6, wherein the state machine determines a duration of the first time interval from a value stored in a register.

* * * * *